Aug. 27, 1929.	R. J. MAREK	1,726,157
TESTING TOOL
Filed April 25, 1928

Inventor
R. J. Marek.
By Lacey & Lacey, Attorneys

Patented Aug. 27, 1929.

1,726,157

UNITED STATES PATENT OFFICE.

RUDOLPH J. MAREK, OF UEHLING, NEBRASKA.

TESTING TOOL.

Application filed April 25, 1928. Serial No. 272,808.

The present invention is directed to improvements in testing tools.

The primary object of the invention is to provide a testing tool so constructed that the same can be firmly connected to the top wall of the piston and the pin bearing to ascertain the condition of the piston with respect to the cylinder wall, the condition of the piston pin bearing, the connecting rod bearing, and crank shaft bearing.

Another object of the invention is to provide a device of this character which can be easily and quickly inserted in a conventional form of piston and tightly engaged therewith in order that the piston can be tested as to wear while all parts are in their normal positions.

Another object of the invention is to provide a device of this character constructed in such manner that when the tool is firmly engaged with a piston it can be manipulated or swung in order to ascertain if there is any play between the piston and cylinder wall, or may be moved upwardly and downwardly to ascertain whether or not the piston pin bearing, connecting rod bearing or crank shaft bearing have become worn, the wear if any, being readily ascertained upon the movement of the piston.

Another object of the invention is to provide a device of this character capable of being used for fitting pistons in cylinders and which is exceedingly simple and light in construction, efficient in operation, and can be manufactured at a very small cost.

While the drawing illustrates a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1:
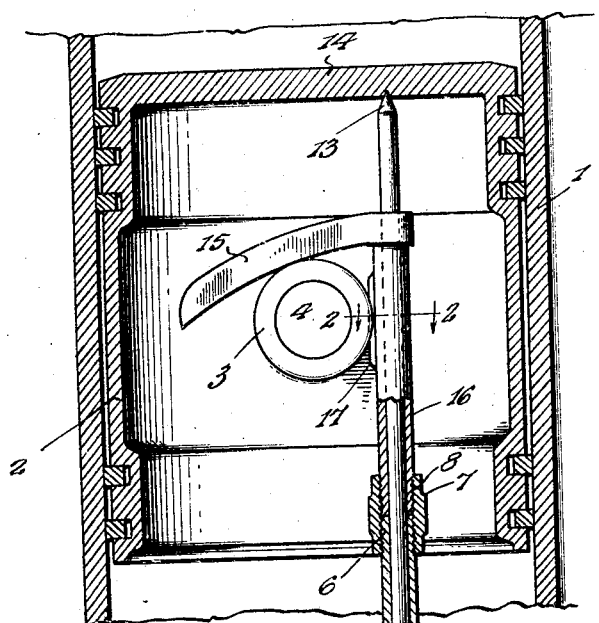
Figure 1 is a vertical, central sectional view through a cylinder and piston, the tool being shown applied thereto.
Figure 2:
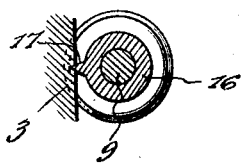
Figure 2 is a sectional view on line 2—2 of Figure 1.

Referring to the drawing, 1 designates a portion of a conventional form of cylinder and in which is operable the usual piston 2 having the bearing 3 for the connecting pin 4.

The tool comprises a tubular member 5, which, in this instance, is formed with a threaded upper end 6 for engagement with the coupling 7, said coupling being interiorly threaded, as at 8, the purpose of which will be later explained.

Slidable in the tubular member 5 is a shaft 9 which stops at a point above the lower end of said member and has engaged therewith the upper end of the screw 10, said screw being threaded in the cap 11 which in turn is threaded upon the lower end of the tubular member 5. The screw 10 is provided with a handle 12 to facilitate the rotation thereof.

The upper end of the shaft 9 is pointed, as at 13, the point being tempered to prolong the life thereof and to enable the same to penetrate the head 14 of the piston 2 when the device is in operation.

A bearing engaging head 15 is employed and is curved longitudinally, said head having a sleeve 16 formed integral therewith for detachable engagement with the coupling 7, said sleeve being threaded for engagement with the thread 8 of said coupling. The sleeve 16 carries a blade 17 which is adapted to bite into the bearing 3 when the tool is in operation to more firmly hold the tool in place.

Figure 3:
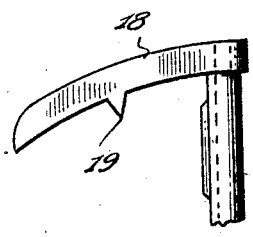
Figure 3 is a modified form of head.
Figure 4:
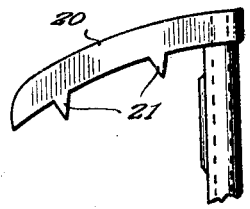
Figure 4 is another modified form of the head.

In Figure 3, a modified form of the invention, the head 18 is provided with a spur 19, while in Figure 4, another modified form of the invention, the head 20 is provided with a pair of spurs 21, it being obvious that the addition of these spurs will permit the heads to be used in connection with piston bearings of different sizes. Obviously, these modified forms of heads can be interchanged when desired.

To use the tool, it is only necessary to remove the bottom of the crank case in order that the tool can be inserted in the cylinder and into the piston, and at which time the shaft 9 is retracted in the sleeve 16 and tubular member 5 in order that the head 15 can be passed over the bearing 3. After the head 15 has been engaged with the bearing the screw 10 is manipulated in order to feed the shaft 9 upwardly until the pointed end 13 thereof bites into the head 14 of the piston. As the shaft 9 moves upwardly, the cap 11 will move downwardly owing to its threaded connection with the screw 10, thus firmly holding the head 15 in binding engagement with the bearing 3. The tool now being tightly engaged with the bearing 3, it will be obvious that if the tubular member 5 is grasped and rocked the piston 2 will be likewise rocked, which will indicate, if the movement is abnormal, that the piston is worn.

To ascertain whether or not the crank bearing and pin bearing are worn, it is only necessary to move the tubular member 5 upwardly and downwardly, and if there is play it will be indicated by the movement of the tubular member. It will be of course understod that considerable force will be necessary to make a test of this kind since the weight of the piston will make the operations more strenuous than merely rocking the tubular member to test as to clearance of the piston with respect to the cylinder wall.

After the test has been made it is only necessary that the rotation of the screw 10 be reversed in order to permit the shaft 9 to move downwardly a sufficient distance to permit the head 15 to be lifted from engagement with the bearing 3.

Having thus described the invention, I claim:

1. A tool of the class described comprising a head for engagement with the pin bearing of a piston, a tubular member, a shaft slidable in said member, means for forcing the shaft into engagement with the piston head to cause said head to bindingly engage said bearing.

2. A tool of the class described comprising a tubular member, a sleeve detachably connected therewith and having a head carried thereby for engagement with the pin bearing of a piston, a shaft slidable in the tubular member and sleeve and adapted to have its upper end engage the head of the piston, and means for sliding said shaft to cause the bearing engaging head to bindingly engage therewith.

3. A tool of the class described, comprising a tubular member, a shaft adjustably slidable in said member and adapted to engage the head of a piston, a pin bearing engaging head having a sleeve carried thereby and provided with a web for engagement with said bearing, said sleeve being connected with the tubular member, and means for sliding said shafts and to move the tubular member in a reverse direction to cause the bearing engaging head to bindingly engage said bearing.

4. A tool of the class described comprising a head for engaging the pin bearing of a piston, a tubular member connected with the head, a shaft slidable in the tubular member, and means for moving the shaft in one direction and the tubular member in a reverse direction to cause the head to bindingly engage the bearing.

5. A tool of the class described comprising relatively movable elements for engaging the head and pin bearing of a piston.

6. A tool of the class described comprising a curved head for engagement with a pin bearing of a piston, a shaft slidably associated with the head for engaging the head of the piston to hold the first named head in binding engagement with said bearing, as and for the purpose set forth.

In testimony whereof I affix my signature.

RUDOLPH J. MAREK. [L. S.]